Dec. 9, 1969  L. MÜLLER  3,482,937
METHOD OF PREPARING SILICEOUS PIGMENTS
Filed Feb. 9, 1966  2 Sheets-Sheet 1

INVENTOR
LOTHAR MÜLLER

BY
ATTORNEYS

United States Patent Office 3,482,937
Patented Dec. 9, 1969

3,482,937
METHOD OF PREPARING SILICEOUS PIGMENTS
Lothar Müller, Wesseling Bezirk Cologne, Germany, assignor to Deutsche Gold- und Silber-Scheideanstalt vormals Roessler
Filed Feb. 9, 1966, Ser. No. 526,279
Claims priority, application Germany, Oct. 20, 1965,
D 48,464
Int. Cl. C01b 33/20
U.S. Cl. 23—182
10 Claims

ABSTRACT OF THE DISCLOSURE

Finely-divided pigments are produced by forming a reactant solution of the desired concentration, introducing the solution to a reaction vessel, introducing one or more additional reactant solutions to the reaction vessel, and removing the reaction mixture. Each step is carried out continuously to provide for a continuous process for the production of pigment. As an example, a sodium silicate solution is continuously diluted to form a solution of lesser concentration. The diluted solution is continuously introduced to a reaction vessel where a precipitation solution of hydrochloric or sulfuric acid is also continuously introduced. The resulting slurry of pigment is continuously withdrawn for additional processing. Several reaction vessels may be connected in series and separated by containers which provide for a maturing or aging period, if desired.

---

Figure 1:
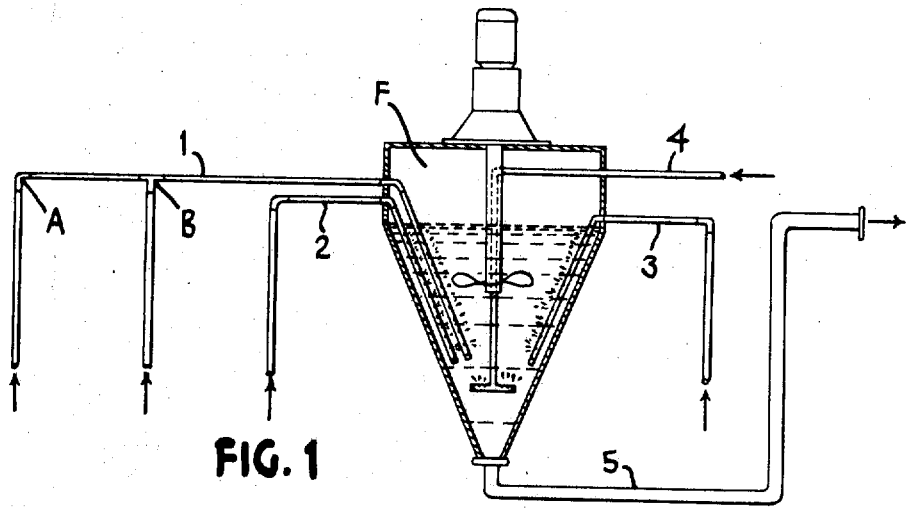

This invention relates to the production of finely-divided precipitated compounds. It more particularly relates to a continuous method and equipment for the production of these products, notably hydrated silicic acid and silicates.

In the precipitation of gel-type products, particularly pigments, from aqueous solutions of suitable metal salts by the treatment of said solution with bases, acids and/or salts, the usual procedure is to first prepare a solution of one of the reaction components in a given concentration. A prescribed amount of the other reaction components, also prepared in a pre-determined solution concentration, is then added to the first solution. During this addition, all other conditions, such as the rate of addition and temperature, are carefully controlled. This careful control is necessary to obtain optimum chemical and physical properties of the end product. Alternatively, a solution, diluted with water to the desired concentration, is prepared from one of the reaction components. Solutions of both reaction components are then allowed to flow simultaneously into this "receiving" mixture while the flow rates, temperatures and final quantities of each solution are carefully controlled.

These precipitation methods are useful, for example, in the preparation of finely-divided alkali metal and alkaline earth metal silicate pigments such as sodium, calcium, and barium silicate pigments. Aluminum silicate, hydrated silicic acid, aluminum hydroxide gel and gel-like ferro cyanide blue may also be produced in this fashion. Similar precipitation methods are also used for the production of finely-divided catalysts, for example, copper chrome oxide. These finely-divided metal compounds are often subsequently calcined to produce a commercial product. Finely-divided ammonium uranate can also be made in this fashion from suitable uranium salt solutions and ammonia.

The aforedescribed prior art precipitation process has inherent limitations which require it to be executed in batch rather than continuous fashion. For example, the composition of the receiving mixture in the precipitation vessel must be adjusted periodically. After the completion of the precipitation reaction, the precipitation vessel must normally be emptied and cleaned preparatory to a succeeding batch precipitation reaction. More time and operating personnel are typically required for this operation than for the actual precipitation process. When the solution in the precipitation vessel has been renewed, the composition thereof must be adjusted. The flow rates of the intake solutions must generally again be adjusted. Usually, the optimum end point of each precipitation must be determined by control measurements taken for each batch. These repeated operations are time consuming.

According to an improvement to this precipitation process, it has now been found that, even when a "receiving mixture" of a given solution concentration is required in the precipitation vessel, a continuous precipitation can be effected. According to this improvement, an aqueous receiving mixture of a prescribed solution concentration needed for the precipitation is continuously introduced to a reaction zone before the addition of one or both reaction components. The quantities of the intake solutions are selected such that the resulting reaction mixture corresponds to the optimal conditions desired for intermittent precipitation.

The present invention is based on the following considerations which can be designated as the introduction of a "differential mixture":

According to the previously standard precipitation processes, a given quantity of solution of precipitation components, expressed in centimeters of the level in the solution's container, for example, 50 centimeters is added to a given level of receiving mixture in the precipitation vessel, for example, 100 centimeters. The same chemical and physical composition results in the reaction mixture if the amount of the receiving mixture in the precipitation vessel corresponds to a level of only 10 centimeters and that of the precipitation components to be added is only equal to 5 centimeters. Similarly, the same relationships are present if the prior art precipitation is divided into an endless number of small precipitations. Thus, according to this invention the prior art receiving mixture and the solutions of the reaction components are introduced continuously and separately to a reaction system. A thoroughly mixing occurs in the reaction system. The dimensions of the equipment of the reaction system are selected to correlate the reaction time and the growth period and aging of the precipitated particles with the flow rates of the receiving mixture and reaction solutions.

Preferably, the receiving mixture and the solutions of the reaction components are introduced continuously to the feed tubes of a reaction system. Thorough mixing in the feed tubes is desirably achieved by employing a tangential introduction of the reaction components to the tubes. The reaction often takes place wholly or partially in the tubes.

Figure 2:
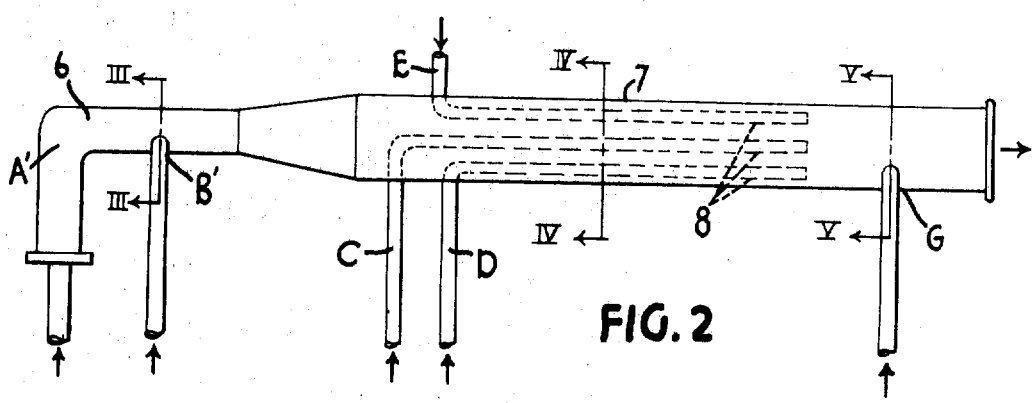
Figure 3:
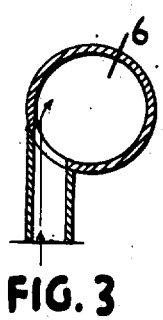
Figure 4:
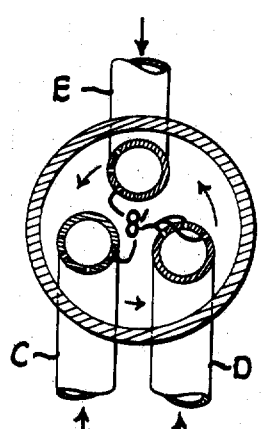
Figure 5:
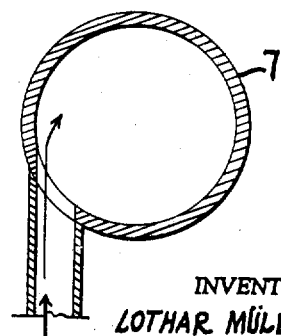
Figure 6:
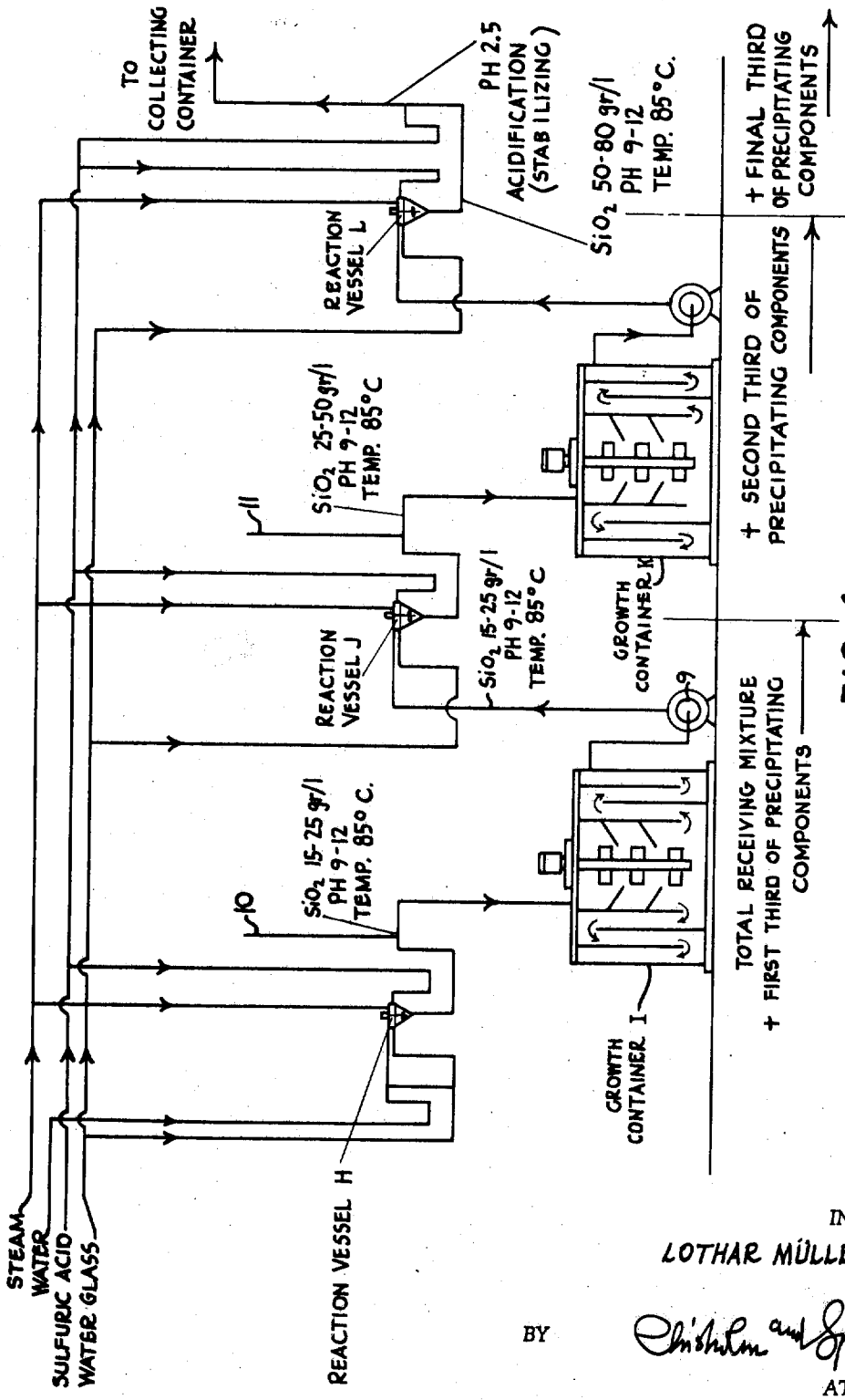

FIGURE 1 shows an embodiment in which the production of the mixture occurs in a tube, while the reaction itself takes place in a stirrer-vessel. FIGURE 2 shows an embodiment of a device for which both the production of the reaction mixture as well as the precipitation occurs continuously in a tube-like reaction vessel. FIGURES 3, 4 and 5 illustrate selected cross-sections of the equipment of FIGURE 2. FIGURE 6 shows an embodiment wherein a series of reaction vessels are incorporated in the reaction system.

In the device shown in FIGURE 1, a prescribed amount of water at a given temperature is added to a tube 1 at point A. At point B, a metal salt solution, for example, an alkali metal silicate, such as sodium silicate solution, is directed into the tube. A thorough mixing of these components is accomplished in tube 1 by any suitable measure. For example, tangential introduction of the liquid at point B is often adequate. Alternatively, a tube expansion (not shown) with an incorporated stirrer may be employed. Given amounts of water and metal salt solution thus flow into the system per unit of time at a given temperature to form the mixture necessary for precipitation. This mixture corresponds to the receiving mixture of the prior art. The mixture flowing through tube 1 enters a stirrer-vessel F. If desired, another metal salt solution of given temperature and quantity, for example, an alkali metal salt solution may be introduced to the stirrer-vessel by means of another tube 2. The acids, bases or salt components employed in the precipitation, at a given concentration and amount, for example, diluted hydrochloric or sulfuric acid, are conveniently introduced through a third tube 3. Vapor, e.g., steam, is introduced into the stirrer-vessel F by means of tube connection 4 as needed to obtain the desired reaction temperature. The precipitation of the desired products in finely-divided form takes place in the stirrer-vessel F. The stirrer prevents the precipitating gel particles from agglomerating unduly. Without this stirring, the product particles often tend to agglomerate when the mixture passes a given pH range. The finished precipitation suspension then flows through tube 5 to a collecting vessel (not illustrated) after which other operations, such as filtering, drying and grinding can be undertaken.

With the equipment shown in FIGURE 2, the introduction of the components for the mixture takes place in a tube 6 at points A' and B', corresponding to points A and B of FIGURE 1, the tangential introduction of the components is seen in FIGURE 3. The actual reaction tube 7 is attached to tube 6. Other reaction components and heating vapors may be directed into said reaction tube 7 at C, D and E through ports 8' in supply tube 8 as illustrated in FIGURE 4. The supply tubes may extend over a long distance, for example, a length of 3 meters or more thereby mixing the reaction components over a substantial length. Good mixing of the reaction components as well as the dispersion of the precipitated product is achieved by the eddies produced in this fashion.

The equipment of FIGURE 2 is especially suitable for producing products which do not tend to a jelly-like hardening during precipitation. Stabilization of precipitated particles produced in the acid pH range can be obtained by adding acid at a slight distance from the point of formation. An introduction tube for mineral acid such as sulfuric acid can be provided at point G for the purpose of stabilizing the particles. See FIGURE 5.

From the continuous precipitation installation, the finished precipitation suspension flows to a collector, from which it can be removed for other operations, such as filtering, drying and grinding. If a longer aging is required for the final precipitation suspension, one or more collecting vessels may be provided. Stabilization by acid-treatment can, if desired, be accomplished after the product has aged in these vessels.

In the production of products with specific desired properties, for example of a given particle size, it is frequently undesirable or ineffective to introduce the entire amount of the necessary precipitating components for the continuously produced product in one work process. A given growth or maturing period is often required before the addition of all the precipitating components to allow for the formation of the desired distribution of particle sizes for the end product. The requisite sequence of steps varies according to the particular product desired. To make a continuous precipitation of this type practical, a series of reaction vessels is incorporated in the reaction system. Only part of the total required quantity of precipitating components is fed to each reactor vessel. The suspension which is formed in the reaction vessels is then fed to intermediate containers for the purpose of achieving the desired maturing or aging period.

In the reaction system of FIGURE 6, for example, only a portion, e.g., one-third of the total required precipitating components, for example, sulfuric acid and water glass, is fed to vessel H along with the total quantity of water and water glass employed as the receiving mixture. The receiving mixture has a pH value of 9–12. The reaction equipment itself corresponds to that of FIGURE 1. The suspension passing from reaction vessel H is thus very diluted and contains approximately 15–25 g./l. $SiO_2$. The dilute suspension is then fed to a growth container I after a residence time of about 2–4 minutes. The pH of the suspension is adjusted as desired by introduction of reaction components, receiving mixture or other suitable reagents through line 10.

The size of the growth container is determined according to the residence time required for the desired product. For the production of finely-divided silica, for example, a total residence time of 60–90 minutes is typical. Whatever the total number of growth containers provided for the system, the individual residence times in the containers are chosen so that their total corresponds to said period (60–90 minutes). If two containers are provided, for example, the residence time in each container is conveniently equal to half the total time. The baffles shown in the containers are for the purpose of avoiding short circuiting of the fluid flow path of the suspension. In this way the residence time for each individual particle is as nearly equal as possible.

The diluted suspension is fed from the growth container I to a second reaction vessel J. A pump 9 may be employed for this purpose. In said second reaction vessel, the second third of the precipitating components is fed. The suspension collected from the second reaction vessel thus contains approximately 25–50 g./l. $SiO_2$. The pH value of the suspension is again adjusted by addition through line 11 of reagents to 9–12. In this example, the suspension temperature is held between about 80° C. and about 90° C., preferably at approximately 85° C. throughout the process. Any other convenient temperature may be chosen. The suspension running from the reaction vessel J is fed to a growth container K which it passes through in a way similar to that described in connection with container I. The interior of the growth containers may be provided with stirring mechanisms if desired to encourage uniform composition of the suspension. After it passes through said second container K, the suspension is introduced to a reaction vessel L, in which the remaining third of the participating components is fed to the suspension.

The final suspension with a content of about 50–80 g./l. silica is directed from said reaction vessel to a collecting vessel. An acidification or stabilization of the suspension can now take place or a third growth container (not illustrated) can be used. Stabilization can be executed behind said container, for example, the addition of acid to adjust the pH value to between about 2 and about 4, preferably about 2.5.

The residence time in each of the individual reaction containers in this example is approximately 2 to 4 minutes. Of course, this time can be varied considerably if desired to obtain products of differing character. Also the portions of the reaction components introduced at the various reaction vessels need not be equivalent. Any convenient number, e.g., 2 or 10, vessels may be employed rather than 3 as in the example.

The described equipment makes it possible to produce products with very definite properties, for example with respect to the filter properties and the particle size distribution. The formation of undesirable agglomerates is avoided. Thus, by the practice of this invention, a more uniform product is obtained. In this way, a pigment with better transparency properties for rubber compounding is now obtainable in a continuous operation which lends itself to complete automation.

Although the invention has been described with reference to specific details of certain preferred embodiments, it is not intended to limit the scope of the invention to these details except insofar as these details are recited in the appended claims.

What I claim is:
1. A process for preparing a finely-divided particulate siliceous pigment comprising:
   (a) combining at a pH of 9 to 12 in the first of a series of reaction zones having an intervening aging zone interposed between each reaction zone, an aqueous solution of an alkali metal silicate with a reactant to form a suspension of siliceous pigment;
   (b) combining at a pH of 9 to 12 in each subsequent reaction zone of said series an aqueous solution of an alkali metal silicate, a reactant and the suspension from the immediately preceding reaction zone to form another suspension of siliceous pigment; and
   (c) the suspension from each immediately preceding reaction zone to each subsequent reaction zone being passed through the corresponding intervening aging zone where it is aged; the total aging periods within all intermediate aging zones being 60 to 90 minutes.
2. The method of claim 1 wherein the aging periods within the intermediate aging zones are equal.
3. The method of claim 1 wherein all steps are conducted continuously.
4. The method of claim 1 wherein the reactant is an acid.
5. The method of claim 4 wherein said acid is sulfuric acid.
6. The method of claim 1 wherein the suspension leaving the last reaction zone is stabilized with acid.
7. The method of claim 6 wherein the pH of said stabilized suspension is in the range of between about 2 and about 4.
8. The method of claim 6 wherein the pH of said stabilized suspension is about 2.5.
9. The method of claim 1 wherein the temperature of all of said suspensions is held between about 80° C. and about 90° C.
10. The method of claim 1 wherein the temperature of all of said suspensions is held at approximately 85°.

References Cited
UNITED STATES PATENTS

| | | | |
|---|---|---|---|
| 3,208,823 | 9/1965 | Baker et al. | 23—182 |
| 3,235,331 | 2/1966 | Nauroth et al. | 23—182 |
| 3,243,262 | 3/1966 | Carr et al. | 23—182 |
| 3,250,594 | 5/1966 | Burke et al. | 23—182 |
| 3,256,068 | 6/1966 | Burke et al. | 23—182 X |

OSCAR R. VERTIZ, Primary Examiner

G. J. OZAKI, Assistant Examiner

U.S. Cl. X.R.

23—113; 252—317